April 21, 1953     J. GELFAND     2,635,347
DENTAL MEASURING INSTRUMENT
Filed June 4, 1949     3 Sheets-Sheet 1
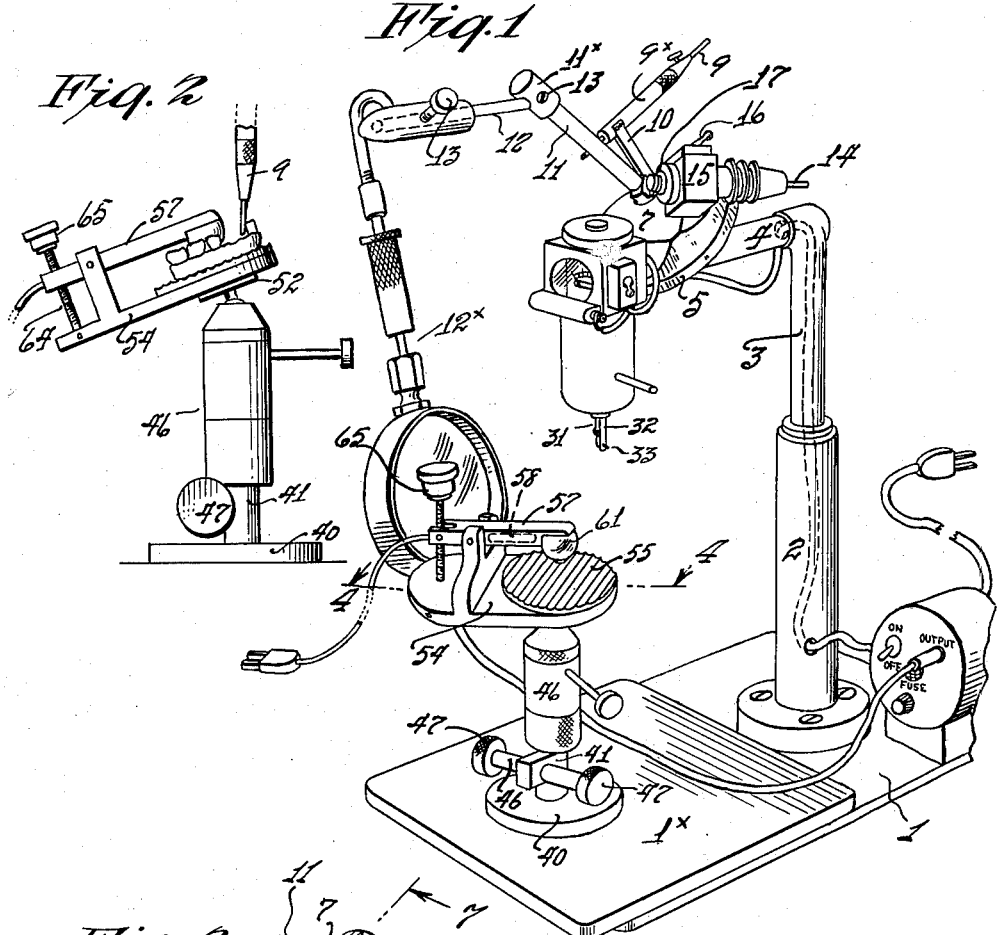
INVENTOR.
Jack Gelfand
BY
H. Lee Helms
ATTORNEY

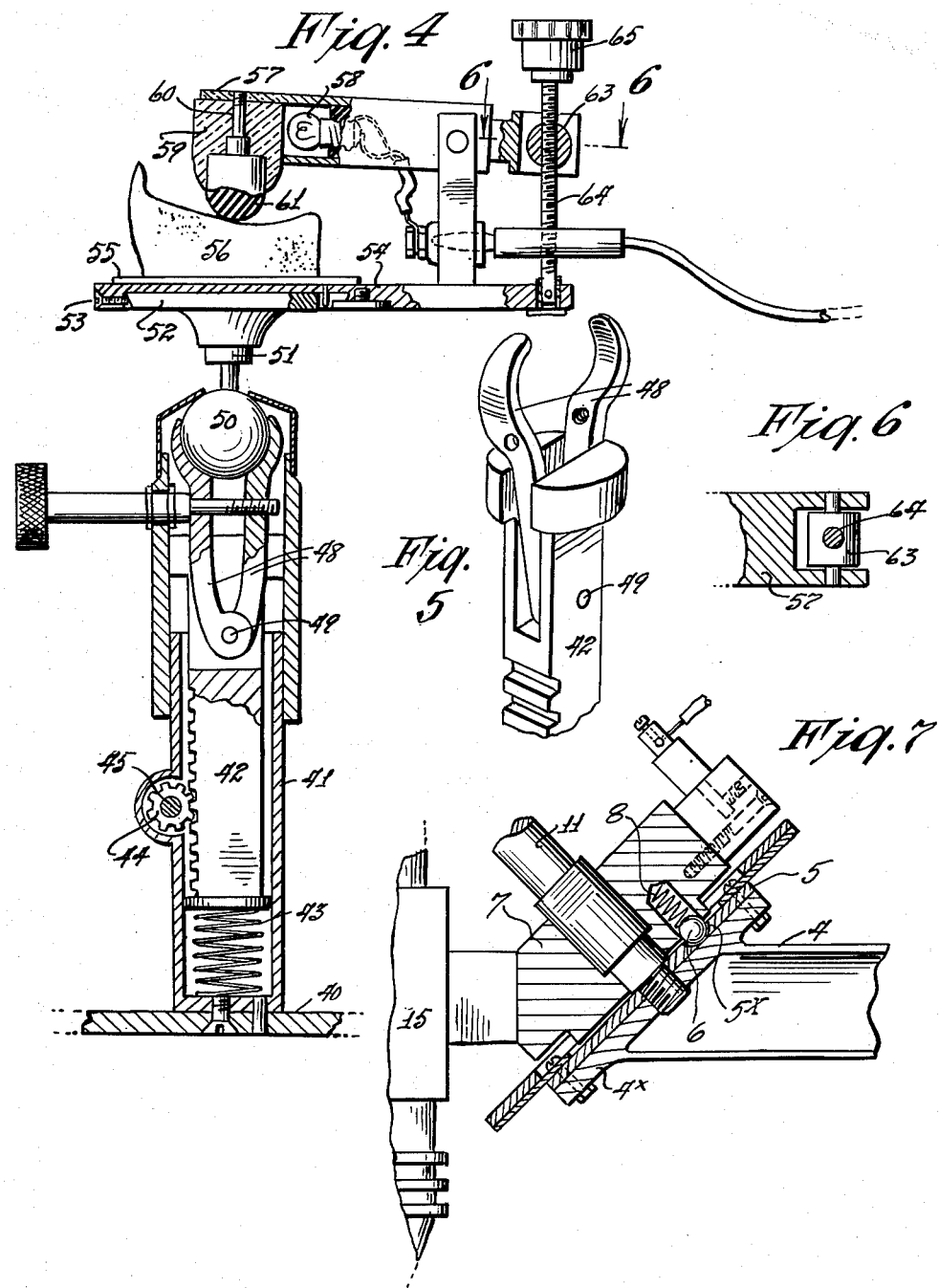

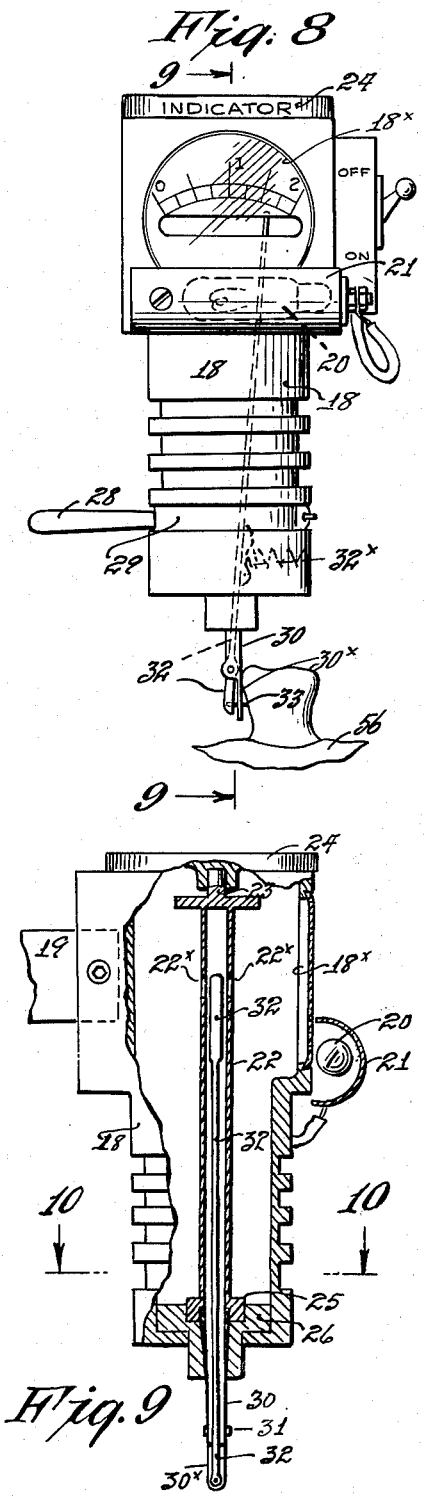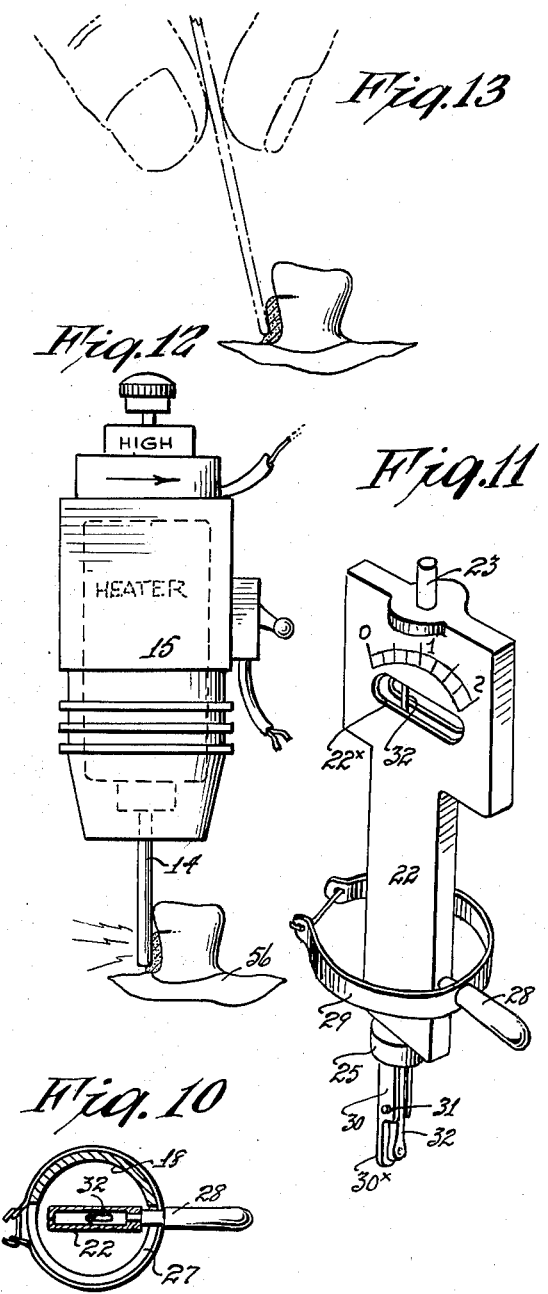

Patented Apr. 21, 1953

2,635,347

UNITED STATES PATENT OFFICE 2,635,347

DENTAL MEASURING INSTRUMENT

Jack Gelfand, Brooklyn, N. Y.

Application June 4, 1949, Serial No. 97,249

3 Claims. (Cl. 33—174)

The present invention relates to apparatus adapted to predetermine and measure dental contours preliminary to the construction of dentures and to permit specific and exact construction of the dentures for proper application, and to provide exactly calculated spacing and retention in the mouth of said dentures.

The invention will be described with reference to the accompanying drawings, in which:

Fig. 1 is a view in perspective showing an embodiment of the invention ready for use upon the application to the adjustable stand of an oral dental replica, as, for example, one cast by impression in a patient's mouth.

Fig. 2 is a view in elevation showing the stand in use with a dental replica thereon and a vertical delineating rod in position, the table of the stand having been adjusted to an incline from the horizontal.

Fig. 3 is an isometric and somewhat schematic view showing the table adjusted to the horizontal, the vertical delineating rod in abutment with a tooth, a clamp element centrally clamping the dental replica onto position and projecting a light beam to illuminate the contour of the tooth relatively to the vertical delineating rod;

Fig. 4 is an enlarged vertical section through the table and clamp assembly;

Fig. 5 is a perspective view, partly broken away showing the yoke and the adjustable carrier therefor;

Fig. 6 is a fragmentary horizontal section on the line 6—6, Fig. 4;

Fig. 7 is a fragmentary view, partly in section on the line 7, Fig. 3;

Fig. 8 is a view in elevation showing the millimeter measuring and marking delineator assembly, the latter being applied to a tooth replica;

Fig. 9 is a vertical section on the line 9—9, Fig. 8;

Fig. 10 is a horizontal section on the line 10—10, Fig. 9;

Fig. 11 is a perspective view showing the rotary adjustable dial and marking delineator removed from its casing;

Fig. 12 is a view in elevation showing the heated wax molding element;

Fig. 13 is a schematic view showing the manual application of wax to a tooth replica below a marking on a tooth replica prior to the molding and smoothing action of the unit shown in the preceding figure.

The apparatus illustrated in the drawings, and which I term a "Retentoscope," consists of a base member 1 from which rises a tubular standard 2, the latter receiving a post 3 which carries a horizontal arm 4. The end of arm 4 carries a plate 4x, Fig. 7, for holding a disk 5, the upper surface of the disk being formed with a succession of annularly arranged shallow sockets, as at 5x, adapted to successively receive a detent ball 6 carried in a socket in the lower face of a rotatable head 7, and pressed down by a spring 8. The head is rotatable upon disk 5 and on a shaft 11 threaded at its lower end in plate 4x.

Rotatable head 7 carries a delineator rod 9, which can be moved to exactly vertical position relatively to a horizontal support 1x carried by base member 1. The rod 9 is provided with a handle 9x held by a bracket 10 extended from head 7. Shaft 11 has removably mounted thereon a sleeve 11x with a projecting rod 12 upon which can be adjustably mounted a magnifier generally shown at 12x. The sleeve can be clamped in position by a screw-stud 13.

Head 7 also carries a hot-element wax molding rod 14 in a heating casing 15. A standard electrical resistance wiring may be employed to heat the rod, and said winding will be in a circuit controlled by a switch indicated at 16.

The millimeter measuring and marking delineator assembly is best illustrated in Figs. 8 to 11 inclusive. It consists of a casing 18, held by bracket 19 on the head 7, the casing having a sight opening at 18x which may be covered by a transparent member. Below the said sight opening is placed an electric lamp 20 shielded by member 21, so that illuminating rays may be thrown interiorly of the casing. Rotatably mounted within the casing is the assembly shown in Fig. 11, and which consists of a flat-faced hollow sub-casing 22, having opposed sight openings at 22x in its faces, and each face having millimeter markings at the top of its sight opening. At its top, sub-casing 22 has a pivot stud 23, which is received in a bearing aperture in the under face of cover 24 for casing 18. At its base the sub-casing has an annular bearing member 25 which is received in a depression formed in a block 26 held within and at the bottom of the main casing 18, the block having a guide nose projecting through an aperture at the base of casing 18.

As shown in Fig. 10, the main casing 18 is formed with a horizontal side aperture which is arcuate and which extends somewhat more than 180°. Projected through said aperture is a handle 28 carried by the sub-casing 22, and the handle may carry an aperture-closing ring-shield 29, the latter being received in an annular channelway formed in the outer wall of casing 18.

In this manner the sub-casing may be rotated 180° to bring either one of its faces into register with the sight opening of the main casing.

In the present embodiment the "bearing member" 25 at the lower end of the sub-casing 22 is secured by press fit onto a depending carrier 30 to which is pivoted at 31 a marking delineator 32 and millimeter indicator pointer, which projects upwardly into the sub-casing 22 and crosses the sight opening at 22x. The lower end of member 32 receives a lead marker 33 which projects through an opening in a flat faced fingerlike lower end 30x of carrier 30. The marker 33 is arranged substantially at right angles to the flat finger 30x (Fig. 8). As indicated by dotted lines at 32x, Fig. 8 the marking delineator 32 is spring pressed in a direction to normally hold the marker 33 outwardly. Hence the finger 30x of carrier 30 may be used as a gauge to determine the exact predetermined degree of projection of the marker 33 relatively to the outer flat face of the finger 30x when the parts are at rest. It is the inward retraction of the marker 33 which effects registration of the dial pointer with the various millimeter designations on the dial when the device is used. To determine the accurate degree of projection of the marker 33 relatively to the finger 30x, a marking lead or implement 33 is placed in position within the marker receiving socket of member 32, the marker 33 projecting through finger 30x, and then the lower end of member 32 is engaged and pushed out to its extreme limit so that its upper pointer end registers with the maximum millimeter designation on the dial. With the parts thus held in position the end of the marker 33 is severed flush with the outer flat face of the said finger 30x.

We now come to the adjustable stand for the denture replica. It consists of a base 40 to which is secured a hollow standard 41 within which is supported a rack 42, which at its lower end may be engaged by a spring 43. A pinion 44, Fig. 4 engages the rack, this pinion being carried by a shaft 45 held within a bearing sleeve 46 extending at opposite sides of tubular standard 41. At each end the shaft carries a finger wheel 47 by which the shaft may be conveniently rotated to raise and lower the rack.

As shown in Figs. 4 and 5, the rack is forked near its upper end, the fork receiving two opposed and mutually pivoted clamp arms 48, the pivot pin being held by the rack, as indicated at 49. The clamp arms, which form a yoke receive the ball end 50 of a supporting stem 51 for a table 52. Table 52 has secured thereto as by one or more set screws 53, an overlying table extension 54. Directly over the table 52, its extension surface may have a serrated facing member 55 of rubber or the like, to receive the various denture replicas, such as 56, for example. The said replicas may be clamped into position by the following means: As best shown in Fig. 4, the table extension 54 has pivotally mounted thereon a clamp arm 57, the latter being hollow to receive an electric lamp indicated at 58. At the end of clamp arm 57 is a transparent head, as of methyl methacrylate 59 or other transparent plastic, which is secured in position by a threaded stem 60 carried by a rubber foot 61. The rear end of the clamping arm is yoked to receive a pivoted member 63 through which passes a screw 64 having a thumb piece 65, and the lower end of the screw carries a headed stud. Thus rotation of the screw by thumb piece 65 will operate the clamp.

The apparatus is used as follows:

The operator will receive a dental cast of the entire upper or lower dental formation of a patient, or a part thereof, as, for example, when the denture is intended to hold one or more artificial teeth for a portion of the mouth. The apparatus is particularly designed for use in the making of partial dentures, and removal bridgework, and as a means for determining the formation and measurement of clasps for partial dentures where the clasps engage the sides of the selected natural holding teeth.

The first step taken by the operator will be to place the cast on the table of the stand, with the latter held in horizontal position. The turret is then rotated to bring the delineator vertically into the position shown in Fig. 3, and the cast will be illuminated at its center. Contact of the delineator point with the upper wider area of the tooth will visually show to the operator the degree of spacing laterally between the undercut lower portion of the tooth and its wider upper side surface because the delineator side will be engaged by that wider surface. Even when the undercut is slight, the degree of undercut will immediately be shown to the operator and he can determine whether that particular tooth should be used as a clasp abutment. Thus the operator may determine that the tooth indicated at 70 in the drawing is best adapted for clasp retention at such side of the mouth. Likewise, the operator may determine that tooth 71 is best adapted for clasp retention at the opposite side of the mouth.

Having determined the best teeth for clasp retention, the operator then removes the delineator point and substitutes the marking graphite tip. Each tooth thus determined for clasp retention is marked with black marking from the graphite tip. Inasmuch as the graphite tip is of the same general form as the delineator 9, it is not separately illustrated. Being held vertically by the handle 9x and the table 54 with the denture being freely rotatable a black marking from the graphite tip will be applied to the broadest surfaces of the tooth selected for clasp retention to indicate that no clasp grip surface should engage the tooth below the said broadest portions, except, of course, at the exact areas where a grip of the clasp is desired.

The turret is then rotated to bring the millimeter marking indicator into position and the marker carried thereby employed to place a horizontal and transverse marking on the tooth at the point determined by the operator as the best point of contact with the tooth by the clasp. By turning the handles 47, the table may be adjusted up and down until the marking pointer, by indication on the dial as to the undercut portion of the tooth, will show the operator by its reading the desired point on the undercut for contact by the clasp.

The selected point of the undercut will be carefully predetermined. The clasp should not have its grip on the tooth at such a deep portion of the undercut as to make application and removal of the denture difficult. At the same time a point of the undercut should be selected which will give adequate holding of the clasp by the broader area of the tooth which extends outwardly of the clasp. By watching the dial while the marking indicator is on the tooth at the clasp receiving surface, as for example at the side of the tooth, and while the tooth is moved up and down, thus showing readings on the dial as to the undercut of the tooth from top to bottom of its surface, the operator will stop vertical movement of the table at that point of indication on the dial which shows the ideal point at which the clasp should engage the particular tooth. Then the stand is moved slightly from side to side to cause a marking on the tooth by the hard lead or graphite point 33. The marking may be slightly above or slightly below the point of contact by the clasp.

The next step, shown in Fig. 6 is to fill in that undercut area of tooth below the point selected for clasp retention and this may be done manually with wax as shown in Fig. 6. Thereupon, the turret is rotated to bring the electrically heated molding rod into the position of Fig. 7, whereupon the table can be moved back and forth to provide a smooth surface molded portion of wax. The surface of the wax will be in vertical line with the broadest upper part of the tooth. By this means, the operator will be guarded against making a clasp which will grip at its strut in addition to its clasp contact with the tooth. This would give greater retention than desired.

In some cases it will be necessary to select a tooth for clasp engagement which tooth has no undercut. Nevertheless, a clasp can be made which will have controlled pressure holding upon such straight tooth, and it is highly important to predetermine the degree of such holding pressure. The tensile resistance of the clasp area for such tooth is a factor which can readily be calculated, and the degree of outward movement of the clasp, through its application to the straight tooth, will control the pressure upon the tooth by the clasp in the tendency of the latter to return to initial position after it is slightly sprung outwardly upon the application to the denture. Thus the clasp action upon the straight wall tooth may be complemented by the holding effect of a second clasp on the same denture applied to the undercut area of a second tooth or even such action on a wall of a straight tooth. For the purpose of determining the proper point on a straight wall tooth at which the clasp of a denture should grip that tooth, the dental replica clamped to the table is moved at an angle by angular movement of the table. The tooth is then brought into contact with the pointer 9, that is to say the delineator, and the angle of the table adjusted until the base of the tooth is spaced away from the delineator, thus producing an artificial undercut. This degree of spacing is adjusted in accordance with the known tensile resistance of the clasp, such degree of spacing selected being that degree the clasp and its connecting area will be sprung, in the application of the denture to the mouth, in order to secure adequate holding and at the same time permit ease in applying the denture and ease in its removal.

By means of the invention, partial dentures can be accurately predetermined with respect to the formation of their clasps for the natural teeth and exactly the ideal position of said clasps with respect to the contours of selected natural teeth, in order that there may be minimum grip commensurate with adequate holding, and hence, ease in the application and removal of the denture.

It will be understood that various modifications may be made in the form and arrangement of the elements illustrated in the drawings, without departing from the spirit of the invention.

What I claim and desire to secure by Letters Patent is as follows:

1. An apparatus adapted to determine and define clasp-retention areas on side-surfaces of dental replicas preliminary to the construction of dentures, comprising a standard, a turret head rotatably carried by the standard, an indicating assembly carried by said turret head, said indicating assembly comprising a rigidly held elongated finger having a flat tooth-abutting surface and depending from said turret head, said finger having an aperture extending through said surface, and a spring pressed arm pivotally mounted intermediate its ends on said finger adjacent said tooth-abutting surface movable toward and away from said finger, a right angularly disposed marking point carried by one end of said arm passing through said aperture in said finger for engaging a tooth of said replica, a scale coacting with the other end of said arm whereby the degree of undercut of a tooth may be determined by movement of the marking point relative to the replica with the former engaging a tooth of the replica, the distance between the extremity of said marking point and said tooth abutting surface being shown by the position of said other end of said arm on said scale.

2. The construction of claim 1 wherein the turret head is hollow and is provided at its upper end with a journal and at its lower end with a second journal having a centrally disposed aperture therein, and wherein there is provided a subassembly comprising a casing into which said arm extends, said scale being positioned on said casing adjacent a sight aperture through which said other end of said arm is visible, and wherein said finger depends from the lower extremity of said subassembly, said subassembly being rotatable within said turret.

3. The structure of claim 2 wherein the turret head is provided with a peripheral exterior annulus having a channel extending therethrough encompassing an arc of 180 degrees and wherein said subassembly is provided with a handle extending through said channel exteriorly of said turret head to permit rotation of said subassembly and hence said marking point through an arc of 180 degrees or less.

JACK GELFAND.

References Cited in the file of this patent

UNITED STATES PATENTS

| Number | Name | Date |
| --- | --- | --- |
| 658,011 | Hopper | Sept. 18, 1900 |
| 826,392 | Wallbillich | July 17, 1906 |
| 924,073 | Hughs | June 8, 1909 |
| 1,070,123 | Evans | Aug. 12, 1913 |
| 1,082,052 | Strang | Dec. 23, 1913 |
| 1,171,565 | Urban | Feb. 15, 1916 |
| 1,296,643 | Fish | Mar. 11, 1919 |
| 1,526,619 | Williams | Feb. 17, 1925 |
| 1,753,965 | Ralph | Apr. 8, 1930 |
| 2,095,665 | Greth | Oct. 12, 1937 |
| 2,108,980 | Wills | Feb. 22, 1938 |
| 2,275,726 | Burns | Mar. 10, 1942 |
| 2,456,447 | Ringle | Dec. 14, 1948 |
| 2,510,152 | Stoll | June 6, 1950 |
| 2,528,053 | Harris | Oct. 31, 1950 |
| 2,581,256 | Hinkle | Jan. 1, 1952 |